United States Patent [19]

Perkins et al.

[11] Patent Number: 5,296,295

[45] Date of Patent: Mar. 22, 1994

[54] RADIATION-CURABLE COATING COMPOSITIONS THAT FORM TRANSPARENT, ABRASION-RESISTANT TINTABLE COATINGS

[75] Inventors: William C. Perkins, Irvine; William Lewis, Tustin, both of Calif.

[73] Assignee: Pilkington Aerospace Inc., Garden Grove, Calif.

[21] Appl. No.: 56,712

[22] Filed: May 3, 1993

Related U.S. Application Data

[60] Division of Ser. No. 809,262, Dec. 17, 1991, Pat. No. 5,221,560, which is a division of Ser. No. 559,499, Jul. 23, 1990, abandoned, which is a continuation of Ser. No. 312,612, Feb. 17, 1989, abandoned.

[51] Int. Cl.$^5$ .................. B32B 27/36; B32B 9/04; C08G 77/04; C08K 5/54
[52] U.S. Cl. .................. 428/412; 428/429; 428/447; 428/480; 428/500; 522/83; 522/84; 522/31; 522/99; 522/170; 528/25; 528/27; 351/162
[58] Field of Search .............. 522/83, 84, 99, 170, 522/31; 427/515; 528/25, 27; 428/412, 429, 447, 480, 500; 351/162

[56] References Cited

U.S. PATENT DOCUMENTS

| | | | |
|---|---|---|---|
| 4,156,046 | 5/1979 | Lien et al. | 522/75 |
| 4,181,766 | 1/1980 | Williams et al. | 428/216 |
| 4,199,421 | 4/1980 | Kamada et al. | 522/168 |
| 4,211,823 | 7/1980 | Suzuki et al. | 428/412 |
| 4,255,468 | 3/1981 | Olson | 528/99 |
| 4,348,462 | 9/1982 | Chung | 522/99 |
| 4,355,135 | 10/1982 | January | 528/28 |
| 4,378,250 | 3/1983 | Treadway | 428/429 |
| 4,455,205 | 6/1984 | Olson et al. | 522/44 |
| 4,478,876 | 10/1984 | Chung | 522/99 |
| 4,486,504 | 12/1984 | Chung | 522/99 |
| 4,491,508 | 1/1985 | Olson et al. | 522/44 |
| 4,497,861 | 2/1985 | Kistner | 528/27 |
| 4,624,971 | 11/1986 | Tao et al. | 522/37 |
| 5,013,608 | 5/1991 | Guest et al. | 428/412 |

FOREIGN PATENT DOCUMENTS 2144345 3/1985 United Kingdom .............. 428/412

*Primary Examiner*—Susan Berman
*Attorney, Agent, or Firm*—Pretty, Schroeder, Brueggemann & Clark

[57] ABSTRACT

Radiation-curable coating compositions which form transparent, abrasion-resistant tintable coatings upon curing by exposure to high intensity irradiation, such as ultraviolet light or electron beam irradiation. The coating composition comprises a combination of effective amounts of (a) colloidal silica, (b) the hydrolysis product of a silane compound having a polymerizable functional group such as acryloxy-functional silanes or glycidoxy-functional silanes or mixtures of both, (c) polyfunctional, polymerizable, non-acrylate-functional ethers, (d) at least one radiation sensitive initiator and, preferably, (e) a monofunctional monomer. When the surface of a substrate coated with the cured coating composition is immersed in a colored dye bath for a sufficient period of time, the coating absorbs or transmits to the substrate a desired amount of dye.

35 Claims, No Drawings

5,296,295

RADIATION-CURABLE COATING COMPOSITIONS THAT FORM TRANSPARENT, ABRASION-RESISTANT TINTABLE COATINGS

This is a division of application Ser. No. 07/809,262, filed Dec. 17, 1991, now U.S. Pat. No. 5,221,560, which was a division of application Ser. No. 07/559,499, filed Jul. 23, 1990, now abandoned, which was a continuation of application Ser. No. 07/312,612, filed Feb. 17, 1989, now abandoned.

BACKGROUND OF THE INVENTION

The present invention relates to tintable, radiation-curable coating compositions. More particularly, the coating compositions of the present invention form transparent, abrasion-resistant coatings upon exposure to high intensity irradiation that absorb a desired amount of colored dye when immersed in a dye bath for a sufficient period of time.

In recent years, synthetic polymeric materials have been utilized in a wide variety of applications. In particular, the substitution of glass glazing with transparent materials which do not shatter, or are more resistant to shattering than glass, has become widespread. For example, transparent polymeric materials, such as polycarbonates, acrylics, and similar plastics, are commonly used as windows in public buildings. Likewise, transparent polycarbonates and acrylics are used in glazing for automobiles, buses, aircraft and other public transportation vehicles. Lenses for eyeglasses and optical instruments also employ shatter-resistant transparent polymeric materials. In addition to their greater resistance to shattering, these transparent polymeric materials are also lighter in weight than glass which is of particular advantage in the transportation industry where the weight of the vehicle is a major factor in its fuel economy.

Although these transparent polymeric materials may be readily fabricated into a desired shape, unfortunately they have relatively low abrasion resistance. Thus, a serious drawback of these materials is the ease with which they are marred and scratched as a result of normal, everyday contact with abrasives, such as dust, cleaning materials, and ordinary weathering. Continued scratching and marring results in impaired visibility and poor aesthetics, and oftentimes requires replacement of the transparent polymeric material. In addition, many such materials do not absorb significant amounts of a colored dye, and therefore cannot be satisfactorily tinted.

It is known to coat the surface of such transparent polymeric materials with a transparent, abrasion-resistant coating to improve their abrasion resistance. Known abrasion-resistant coatings, also referred to as "hard coatings," include coatings formed from silica-containing mixtures, such as colloidal silica or silica gel, and hydrolyzable silanes in a hydrolysis medium, such as alcohol or water. See, for example, U.S. Pat. Nos. 3,708,225; 3,986,997; and 3,976,497. However, such coatings often are difficult to apply, and require heat to initiate the cure reaction which must then be maintained for a lengthy period of time until the cure reaction is completed.

Colloidal silica has also been used to improve the abrasion resistance of ultraviolet light-curable coatings as shown in Chung, U.S. Pat. No. 4,348,462. Ultraviolet light is one of the most widely used types of radiation for curing chemical compositions because of its relatively low cost, ease of maintenance, and low potential hazard to industrial users. Rapid photo-induced polymerizations utilizing ultraviolet light instead of thermal energy for curing hard coatings offer substantial economic benefits, and expend considerably less thermal energy than conventional heat cure systems. Also, heat sensitive materials can be safely coated and cured with ultraviolet light without the use of thermal energy which can damage such substrates. In addition, radiation cured coatings can utilize lower amounts of solvents, thereby reducing the necessity for expensive and time consuming pollution abatement procedures.

However, known abrasion-resistant coatings, whether cured by thermal energy or high intensity irradiation, cannot be satisfactorily tinted as they do not absorb or transmit sufficient amounts of a colored dye when immersed in a dye bath within a reasonable period of time. This is a particular disadvantage in connection with the manufacture of coatings for ophthalmic lenses where a tinted coating aids in protecting the eyes from sunlight as well as in satisfying fashion-conscious consumers.

SUMMARY OF THE INVENTION

The present invention offers a significant advantage over known abrasion-resistant coating compositions in that it is tintable. A tintable, transparent abrasion-resistant coating is obtained by curing with high intensity irradiation a coating composition comprising (a) an effective abrasion-resistant amount of colloidal silica, (b) about 0.05 to about 5 parts by weight per each part colloidal silica of a hydrolysis product of a silane having a polymerizable functional group such as acryloxy-functional silanes or glycidoxy-functional silanes, or mixtures of both, (c) an effective tintable amount of a polyfunctional, polymerizable non-acrylate-functional ether, and (d) an effective catalytic amount of a radiation sensitive initiator. Preferably, the coating composition also includes a monofunctional monomer.

The silanes assist the colloidal silica in imparting high abrasion resistance to the cured coating as does the monofunctional monomer when included. The polyfunctional, polymerizable non-acrylate-functional ethers also contribute to the coating's abrasion resistance and are instrumental in the ability of the coating of the present invention to absorb or transmit to the substrate the desired amount of colored dye. Such ethers are preferably selected from glycidyl ether compounds, allyl ether compounds, vinyl ether compounds, cycloaliphatic diepoxide compounds, and combinations thereof. Particularly preferred non-acrylate-functional ethers are mixtures of at least two such compounds, each of which has at least one of the preferred ether moieties.

The coating compositions of the present invention do not require heat to initiate the cure reaction but are catalyzed by a radiation sensitive initiator upon exposure to high intensity irradiation. Although cationic-type catalysts can be utilized alone in curing coating compositions of the present invention that do not include polymerizable free radical groups, or when electron beam irradiation is used to cure the coating composition, it is preferred that combinations of radical-type and cationic-type photoinitiators are utilized since a combination of catalysts and cure mechanisms generally provides tighter cure properties and improved abrasion resistance. The radiation sensitive initiators may be utilized in different amounts, but generally the cationic-type catalysts, such as onium salts, are present in an amount ranging from about 0.05 to about 10% by weight of the total composition, and preferably comprise an amount of about 0.1 to about 1.5%. Similarly, the radical-type photoinitiators, if present, are also ordinarily used in an amount ranging from about 0.5 to about 10% by weight of the entire mixture, and preferably from about 1 to about 3% by weight.

A multifunctional acrylate monomer may optionally be added to the coating compositions of the present invention to aid in improving adhesion. Such monomers that do not contain a silyl moiety are particularly preferred.

The present invention provides transparent, abrasion-resistant coatings employing colloidal silica which are tintable and which are cured by high intensity irradiation. The ability to absorb or transmit a desired amount of colored dye is accomplished through the specific combination of colloidal silica with a hydrolyzable silane having a polymerizable functional group such as acryloxy- or glycidoxy-functional silanes, a polyfunctional polymerizable non-acrylate-functional ether, a catalytic amount of a radiation sensitive initiator and, preferably, a monofunctional monomer. The cured coating compositions of the present invention are tintable, abrasion-resistant, have good adhesion to a substrate and do not adversely affect the substrate.

Accordingly, it is an object of the present invention to provide a novel tintable, radiation-curable coating composition that forms a transparent, abrasion-resistant coating.

It is a further object of the present invention to provide a tintable coating composition that can be cured by high intensity irradiation, such as ultraviolet light or electron beam irradiation.

Another object of the present invention is to provide a tintable, radiation-curable coating composition which, when cured, forms a transparent, abrasion-resistant coating that will absorb or transmit to the substrate a colored dye without significantly impairing the optical clarity of the substrate upon which it is coated.

A more thorough disclosure of the present invention is presented in the detailed description which follows.

DETAILED DESCRIPTION OF THE INVENTION

The present invention contemplates the formation of a tintable, transparent, abrasion-resistant coating by using high intensity irradiation to cure a coating composition comprising an effective abrasion-resistant amount of colloidal silica; from about 0.05 to about 5 parts by weight per each part colloidal silica of a hydrolysis product of a silane having a polymerizable functional group, preferably an acryloxy-functional silane or a glycidoxy-functional silane or a mixture of both; an effective tintable amount of a polyfunctional, polymerizable non-acrylate-functional ether; a catalytic amount of a radiation sensitive initiator; and preferably a monofunctional monomer. The coating compositions of the present invention are coated using well-known techniques onto selected substrates, such as polycarbonate plastics, and are cured by exposure to high intensity irradiation, such as ultraviolet light or electron beam irradiation. The cured coatings absorb or transmit a desired amount of colored dye when immersed in a dye bath for a sufficient period of time.

Colloidal silica is ordinarily sold in dispersion form. The silica may be dispersed in organic or aqueous solutions. For example, Nalco ® 84SS-258 is a particularly preferred dispersion containing 30% silicon dioxide in an organic solution. Although it is preferred that the colloidal silica employed in the present invention is dispersed in an organic solution, aqueous dispersions of colloidal silica, such as Nalco ® 1034 which is an aqueous solution containing 34% silicon dioxide, may also be employed in the coating compositions of the present invention. However, since the monomers described below which are incorporated into the coating compositions of the present invention must be compatible with the colloidal silica, the specific monomers selected may vary depending upon whether the colloidal silica is in an organic or aqueous solution. Preferably, the colloidal silica comprises from about 15 to about 40 parts by weight of the coating composition with the silica comprising from about 30 to about 60 percent of the total solids. It will be understood by those skilled in the art that reducing the silica content substantially below about 25% of the total solids in the coating also reduces significantly the coating's abrasion resistance.

The second necessary component in the coating composition of the present invention is from about 0.05 to about 5 parts by weight per each part colloidal silica of the acid hydrolysis product of a silane having a polymerizable functional group, preferably an acryloxy-functional silane or a glycidoxy-functional silane or a mixture of both. The hydrolysis product is preferred so that a sufficient amount of water is present to promote the reaction between the colloidal silica and the silane. Preferably, the ratio of silica to silane in the coating compositions of the present invention ranges from about 4:1 to about 2:3 based on total solids, and more particularly from about 4:1 to about 3:1 for optimum abrasion resistance. While any silane having a polymerizable functional group may be used in the present invention, acryloxy- and glycidoxy-functional silanes are preferred because they are known to be commercially available.

The acryloxy-functional silane has a general formula given by (I):

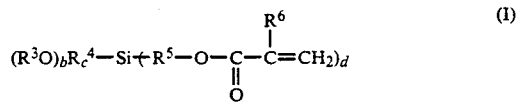

wherein $R^3$ and $R^4$ are the same or different monovalent hydrocarbon radicals, including halogenated species of such radicals. Preferably, $R^3$ and $R^4$ will be lower alkyl radicals such as methyl, ethyl, propyl, etc., but may include other saturated and unsaturated species including vinyl, aryl, etc. $R^5$ is a divalent hydrocarbon radical having from 2 to 8 carbon atoms. $R^6$ is a hydrogen or a monovalent hydrocarbon radical. The letter b is an integer from 1 to 3, c is an integer from 0 to 2 and d is an integer equaling 4-b-c. In many of the embodiments of the present invention, b will ordinarily be 3, c will be 0 and d will equal 1. Specific examples of acryloxy-functional silanes include:
3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane 3-acryloxypropyltriethoxysilane
2-methacryloxyethyltriethoxysilane
2-acryloxyethyltriethoxysilane Such acryloxy-functional silanes are commercially available. For example, 3-methacryloxypropyltrimethoxysilane can be obtained from Petrarch Systems, Inc.

Glycidoxy-functional silanes may be used instead of the acryloxy-functional silanes just described, or combinations or mixtures of both types of silanes may be used. A glycidoxy-functional silane has the general formula given by (II):

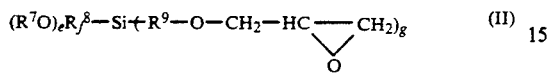

wherein $R^7$ and $R^8$ are the same or different monovalent hydrocarbon radicals as described above for $R^3$ and $R^4$. $R^9$ is a divalent hydrocarbon radical having from 2 to 8 carbon atoms. The letter e is an integer from 1 to 3, f is an integer from 0 to 2 and g is an integer equaling 4-e-f. Specific examples of useful glycidoxy-functional silanes are the following:
3-glycidoxypropyltrimethoxysilane
2-glycidoxyethyltrimethoxysilane
3-glycidoxypropyltriethoxysilane
2-glycidoxyethyltriethoxysilane These glycidoxy-functional silanes are also commercially available. One source, for example, is Petrarch Systems, Inc.

The third necessary component of the coating composition of the present invention is an effective tintable amount of a polyfunctional, polymerizable, non-acrylate-functional ether which has been found to increase significantly the abrasion resistance of the cured coating, and is instrumental in providing tintability. The coating composition of the present invention preferably contains from about 0.1 to about 1.0 parts by weight per each part colloidal silica of the polyfunctional, polymerizable non-acrylate-functional ether.

Preferred polyfunctional, polymerizable non-acrylate-functional ethers utilized in the present invention are selected from the group consisting of compounds having at least one of the following moieties: a glycidyl ether, an allyl ether, a vinyl ether, a cycloaliphatic epoxide, and mixtures of any two or more of such compounds. Such preferred mixtures include mixtures of (i) a triglycidyl ether and a polyethylene glycol divinyl ether; (ii) a triglycidyl ether and a polyallyl-functional ether such as tetraallyloxyethane; (iii) a triglycidyl ether and a cycloaliphatic diepoxide; and (iv) a polyethylene glycol divinyl ether and a cycloaliphatic diepoxide. Specific examples of suitable polyfunctional, polymerizable non-acrylate functional ethers are listed in Table 1. Where the identified compounds are sold commercially using a trademark or brand name, the chemical name is followed by the commercial name in parentheses.

TABLE 1

| Ethers | Chemical Name (Commercial Name, if applicable) |
|---|---|
| Glycidyl-functional ethers | Triglycidyl ether (Epirez 5044, 5048) |
| | gamma-glycidoxy propyltrimethoxy silane (Z6040, Dynasylan Glymo, and Prosil 5136) |
| | Triglycidyl ether (Photomer 1149) |
| | 1,4-Butanediol diglycidyl ether |

TABLE 1-continued

| Ethers | Chemical Name (Commercial Name, if applicable) |
|---|---|
| | (Echo Resin 405) |
| | Bisphenol A diglycidyl ether (Epirez 505) |
| Allyl-functional ethers | 1,1,2,2-Tetraallyloxyethane (none) |
| | Triallylcyanurate (none) |
| | Polyallylglycidyl ether (none) |
| | Allylglycidyl ether (Echo Resin 401) |
| Divinyl ethers | Triethylene glycol divinyl ether (Rapi-Cure DVE-3) |
| | Diethylene glycol divinyl ether (none) |
| | Tetraethylene glycol divinyl ether (none) |
| | Dipropylene glycol divinyl ether (none) |
| | Tripropylene glycol divinyl ether (none) |
| | 1,4-divinyloxybutane (none) |
| | Hexanediol divinyl ether (none) |
| Cycloaliphatic Diepoxides | Alicyclic diepoxide carboxylate (Araldite CY179 and Cyracure UVR-6110) |

To the mixture of the three components described above must be added a catalytic amount of a radiation sensitive initiator. Preferred types of radiation are ultraviolet light and electron beam irradiation. Examples of effective radiation sensitive initiators include halonium, sulfonium, and phosphonium salts which have been described in the literature, and cationic and free radical photoinitiators which are also known.

Cationic photoinitiators have been described by Crivello in numerous U.S. patents and applications, such as the following, for example, which are hereby incorporated by reference: U.S. Pat. No. 4,136,102, issued Jan. 23, 1979, and U.S. Pat. No. 3,981,897, issued Sep. 21, 1976. Such cationic photoinitiators can have the general formula given by (III):

$$(R^{10}-C_6H_4)_nX^+MQ_h^- \quad (III)$$

In this formula, X is a radical selected from I, P or S. M is a metal or metalloid and Q is a halogen radical selected from Cl, F, Br or I. $R^{10}$ is a hydrogen or monovalent hydrocarbon radical having from 1 to 12 carbon atoms. The letter h is an integer having the value of 4 to 6 inclusive, and n is an integer having the value of 2 or 3.

The expression $MQ_h^-$ applies to any number of ionic species but preferably will be selected from $SbF_6^-$, $AsF_6^-$, $BF_4^-$ and $PF_6^-$. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro arsenate, and hexafluoro antimonate.

These cationic photoinitiators are particularly effective for initiating a cross-linking reaction upon exposure to ultraviolet radiation. Good hard coatings having excellent adhesion can thus be obtained when the coating composition is applied to a substrate and exposed to high intensity irradiation such as that provided by UV lamps.

Preferably, approximately 0.1 to 1.5 parts by weight of the cationic photoinitiator are used for every 100 parts by weight of the mixture of the three necessary components described above. However, depending upon individually desired process parameters, such as rate of cure, and the ultimate abrasion-resistance sought, the amount of the photoinitiator can range from approximately 0.05 to about 10 parts by weight per 100 parts of the mixture.

As mentioned above, cationic-type catalysts can be used alone in curing the coating compositions of the present invention so long as no polymerizable free radical groups are present or, if present, electron beam irradiation is used to cure such compositions. However, if polymerizable free radical groups are present, such as the acryloxy-functional portion of a silane or a multifunctional acrylate monomer, improved abrasion resistance can be obtained with the coating compositions of the present invention when, in addition to the cationic photoinitiators described above, there is also utilized a radical-type initiator which is effective for cross-linking such free radical groups. Such radical photoinitiators include, among others, benzoin ethers, alpha-acyloxime esters, acetophenone derivatives, benzil ketals and ketoneamine derivatives. Specific examples of these photoinitiators include ethyl benzoin ether, isopropyl benzoin ether, dimethoxyphenyl acetophenone, diethoxy acetophenone, and benzophenone.

The radical-type initiators are used in an amount from about 0.5 to about 10.0% by weight of the mixture of the four necessary components, and more particularly from about 1 to about 3% by weight. When a combination of photoinitiators is employed, a cationic-type initiator, such as triphenylsulfoniumhexafluoroantimonate, comprises approximately 10 to 90% by weight of the combination with the remaining portion comprising a radical-type initiator such as benzophenone.

The coating compositions of the present invention also preferably include a monofunctional monomer which has been found to contribute significantly to the abrasion resistance of the cured coating when used in combination with the colloidal silica and the silanes described above. Preferred monofunctional monomers include vinyl acetate, phenyl allyl ether, 2-hydroxyethylacrylate, tetrahydrofurfuryl acrylate, tetrahydrofurfuryl methacrylate, methyl acrylate, methyl methacrylate, ethyl acrylate, ethyl methacrylate, propyl acrylate, and propyl methacrylate. Preferably, from about 0.1 to about 1.5 parts by weight per each part colloidal silica of the monofunctional monomer are used.

Optionally, a multifunctional acrylate monomer may be added to the coating compositions of the present invention to aid in improving adhesion. Such monomers that do not contain a silyl moiety are particularly preferred. Preferably, the multifunctional acrylate monomer is present in an amount ranging from about 0.05 to about 1.5 parts by weight per each part colloidal silica.

Substrates which are especially contemplated herein are transparent and non-transparent plastics, metals, and even glass. More particularly, these plastics are synthetic organic polymeric substrates, such as acrylic polymers like poly(methylmethacrylate), polyesters such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. The coating compositions of this invention are especially useful as coatings for polycarbonates, such as poly(bisphenol-A carbonate) and those polycarbonates known as Lexan®, sold by General Electric Company, and as coatings for cast, injection molded or extruded acrylics, such as polymethylmethacrylates, as well as other transparent plastic materials widely used for glazing. Metal substrates on which the present protective coatings are also effective include bright and dull metals like aluminum and bright metallized surfaces like sputtered chromium alloy. Also included are synthetic organic polymer substrates which themselves have a metallized surface. Other solid substrates contemplated herein include wood, painted surfaces, leather, glass, ceramics and textiles.

The radiation-curable coating composition of the present invention is ordinarily coated on at least one surface of the solid substrate. However, prior to the composition being coated on the substrate, an optional priming step may be included wherein a lacquer/thermoplastic, thermoset, or UV-cure primer, such as a thermosetting acrylic emulsion, can first be applied to the substrate.

The coating compositions of the present invention can be applied to the substrate or to the primed substrate by conventional methods, such as flowing, spraying or dipping, to form a continuous surface film. In addition, as set forth in U.S. Pat. No. 4,491,508, the disclosure of which is hereby incorporated by reference, the solvent may be distilled from the coating composition prior to application to form a substantially solvent-free coating composition of the present invention which can then be applied to the substrate by such conventional methods. By choice of the proper formulation, application conditions and pretreatment of the substrate including the use of primers, the coatings can be adhered to substantially any solid substrate.

Coating thicknesses may vary depending upon the degree of abrasion resistance, adhesion, and haze desired. Coatings having thicknesses from about 2 to about 10 microns, and in particular from about 3 to about 7 microns, are generally preferred. Optimum coating thicknesses are obtained by slow dip coating procedures.

The coating compositions of the instant invention may also optionally contain various flatting agents, surface active agents, coupling agents, thixotropic agents, UV light absorbers, dyes, or other non-deleterious additives known in the art. The various surface-active agents, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference. All of these additives and the use thereof are well-known in the art and do not require extensive discussion. Therefore, only limited reference will be made to such agents, it being understood that any of these compounds can be used so long as they do not deleteriously affect the radiation curing of the coating compositions and do not adversely affect the nonopaque character or other end-use properties of the coating.

In the practice of the present invention, the radiation-curable coating compositions are preferably compounded by first mixing together the colloidal silica and the silane with a sufficient amount of water to make certain that the hydrolysis product of the silane is formed which promotes the reaction between the colloidal silica and the silane. This mixture is stirred at room temperature for a time sufficient for the reaction between the colloidal silica and the silane to be completed, generally between about 1 to about 20 hours.

The polyfunctional, polymeric non-acrylate functional ether or mixtures thereof, the monofunctional monomer, the radiation sensitive initiator and, optionally, any of the other aforementioned additives, are then added and the mixture is thoroughly stirred so as to form a generally homogeneous coating composition. Additionally, if so desired to reduce the viscosity of the coating formulation, an organic solvent, such as an alcohol, may optionally be incorporated into the formulation. Generally, the amount of solvent present, if any, should be such that evaporation of the solvent occurs before causing any deleterious effect on the substrate. A thin, uniform coating of the coating solution is then applied onto the substrate, or the primed substrate, by any of the known means such as dipping, spraying, rollcoating and the like. The coating is then cured, preferably in a non-inert atmosphere, e.g., air, by high intensity irradiation, such as UV radiation which can have a wavelength of from about 2000 A. to about 4000 A. While the coating may also be cured in an inert atmosphere, such as nitrogen, inert atmospheres are expensive and are not required to cure the coating compositions of the present invention. By "curing" is meant both polymerization of the polyfunctional monomers and cross-linking of the polymers to form hard, non-tacky coatings.

The lamp systems used to generate UV radiation of such wavelengths can consist of discharge lamps as, for example, xenon, metallic halide, metallic arc, low or high pressure mercury vapor discharge lamps, etc., having operating pressures of from as low as a few milli-torr up to about 10 atmospheres. Examples of such lamps include a Hanovia 550 watt lamp or a PPG Processor, Model QC 1202.

When a tinted coating is desired, the surface of a substrate coated with a cured coating of the present invention is immersed in a heated dye bath containing a suitable colored dye, e.g., BPI Sun Brown, a molecular catalytic dye sold by Brain Power Incorporated of Miami, Fla. The dye solution is prepared by diluting one part of BPI Sun Brown dye concentration to ten parts water, and then heating the resulting solution to a temperature in the range of about 190° to 212° F. while constantly stirring the solution. The coated surface of the substrate is preferably cleaned by wiping with a compatible solvent prior to immersion in the dye bath for a period of time sufficient to absorb or transmit the desired amount of dye, then washed with distilled water to remove the excess dye and blotted dry. The intensity of the tint can be adjusted by varying the concentration of the polyfunctional, polymerizable non-acrylate-functional ether in the coating composition or the thickness of the coating. The degree of tint obtained can be determined by using a colorimeter, such as a Gardner XL-835, which measures the percent of light transmittance.

A significant property of the coating composition of the present invention is that the desired amount of dye can be absorbed or transmitted to the substrate within a reasonable length of time. For example, in the ophthalmic industry two levels of light transmittance ("LT") are generally used in connection with the application of tints to lenses for eyeglasses. A 50% light transmittance means that the amount of dye absorbed or transmitted is sufficient to allow only 50% of the light to pass through the tinted lens. This is generally the level of light transmittance applicable to "fashion" tints for eyeglasses. A darker tint such as that used for sunglasses generally has a 20% light transmittance which means that the amount of dye absorbed or transmitted allows only 20% of the light to pass through the lens. One particular type of plastic commonly used in the ophthalmic industry to make lenses, CR-39, generally will tint to 20% LT in approximately 15 minutes. Accordingly, it is desired that a 20% LT be achieved within 15-30 minutes under standard conditions. While the coating compositions of the present invention are able to achieve a 20% LT within this time period, they preferably achieve a 20% LT within from about 5 to about 15 minutes.

As stated above, the coating compositions of the present invention are silica-based due to the condensation of colloidal silica and the various hydrolyzable silanes. Those skilled in the art will recognize that the relative weight percent of the colloidal silica can be varied in proportion with the remaining coating composition ingredients. The silica content can be adjusted by varying the relative amounts of the constituent components. This adjustment in silica content will, in turn, influence the physical properties of the hard coat. For example, the percent silica content is inversely related to the $\Delta\%$ H, which is a quantitative measure of haze on coated products according to the Taber Abrasion Resistance test, ASTM No. D 1044. That is to say, as the silica content becomes a greater percentage of the total solids in the hard coating, the value of $\Delta\%$ H will decrease for that particular hard coat. It will be recognized that such lower values of $\Delta\%$ H indicate improved abrasion resistance for those hard coats. Generally, coatings having acceptable abrasion resistance have a $\Delta H_{500}$ (i.e., after 500 cycles) of less than about 15%.

In order to more fully and clearly describe the present invention so that those skilled in the art may better understand how to practice the present invention, the following examples are given. These are intended to illustrate rather than limit the invention disclosed and claimed herein. In each example, all parts are by weight.

EXAMPLE 1

A mixture of 100 parts by weight colloidal silica suspension (Nalco® 84SS-258, which contains 30% solids in Propyl Cellosolve), 7.5 parts by weight gamma-methacryloxypropyltrimethoxysilane ("MPTMS") and 5 parts by weight water was mixed at room temperature for 1½ hours. 2.5 parts by weight 1, 1, 2, 2-tetraallyloxyethane, 5 parts by weight triglycidyl ether (Celanese Epirez 5044) and 10 parts by weight vinyl acetate were added and mixed until the solution was homogeneous. Next were added 1.5 parts by weight of triphenylsulfonium hexafluoroantimonate and 1.5 parts by weight benzophenone, followed by 0.02 parts by weight FC-430 flow control agent. Additional compositions were also made in an identical manner, differing only in the amount of silica and MPTMS used to show the effect of changing these amounts on abrasion resistance and tintability. A film of each composition having a thickness of about 7 microns was applied to a polyester sheet which was passed through a UV processor. Three passes through the system at 15 ft./min. in air resulted in a coating which is clear and hard.

The coated polycarbonate panel was tested on a Taber Abraser which involves measuring the increase in haze ($\Delta\%$ H) after being subject to 500 cycles of abrasive CF-10 wheel. Coating adhesion was also tested using the crosshatch adhesion test, ASTM No. D 3359. This involves scribing a criss-cross pattern (grid) on the coated surface, applying a 3M 710 tape, and pulling it away. Three tape pulls with no adhesion loss is considered passing. Coating tintability was tested by measuring the change in light transmittance (LT) as a function of a 15 minute immersion in a BPI sun brown colored dye bath (1:10 dilution) heated to about 90° C. The lower the percent of light transmitted, the greater is the amount of dye absorbed or transmitted by the coating during the selected time period, here 15 minutes. The following results were observed:

TABLE II

| Sample | Colloidal Silica (g) | MPTMS (g) | %Δ H$_{500}$ | Adhesion | Tint LT(%) |
|---|---|---|---|---|---|
| A | 100 | 7.5 | 7.0 | pass | 35.1 |
| B | 75 | 7.5 | 7.7 | pass | 23.9 |
| C | 50 | 10 | 13.4 | pass | 21.7 |
| D | 25 | 15 | 25.5 | pass | 10.9 |
| E | 50 | 5 | 11.2 | pass | 4.8 |
| F | 50 | 15 | 16.2 | pass | 14.4 |

As shown in Table II, the silica content is inversely related to the Δ% H. That is to say, as the silica content becomes greater, e.g., Samples A and B, the value of Δ% H decreases. Such lower values of Δ% H denote improved abrasion resistance. The abrasion resistance of Sample D, which has a ΔH of 25.5% after 500 cycles, is not acceptable. The light transmission of all of the samples has been substantially reduced after immersion for only 15 minutes. Samples B and E exhibit the best combination of abrasion resistance and reduced light transmission.

EXAMPLE 2

A mixture of 100 parts by weight colloidal silica suspension (Nalco ® 84SS-258), 7.5 parts MPTMS, and 5 parts water was mixed at room temperature for 1½ hours. 5 parts triglycidyl ether (Epirez 5044) and 10 parts vinyl acetate were added and mixed until the solution was homogenous. Next were added 1.5 parts by weight each triphenyl sulfonium hexafluoroantimonate and benzophenone, followed by 0.02 parts by weight of FC430 flow control agent. This composition was coated to a thickness of 7 microns on a polyester sheet which was then passed through a UV processor in air as in example 1. Excellent adhesion, abrasion resistance and tintability were obtained, and the results are set forth in Table III.

EXAMPLE 3

A mixture of 52 parts by weight colloidal silica suspension (Nalco ® 84SS-258), 8 parts by weight gamma-glycidoxy propyltrimethoxysilane ("GPTMS") and 5 parts by weight water was mixed at room temperature for 1½ hours. 5 parts triglycidyl ether (Epirez 5044), 10 parts trimethylolpropane triacrylate, and 10 parts vinyl acetate were added and mixed until the solution was homogeneous. Next were added 1.5 parts by weight each of triphenyl sulfonium hexafluoroantimonate and benzophenone. This composition was coated at a 7 micron thickness on a polycarbonate panel, which was then passed through a UV processor in air as in example 1. Excellent adhesion, abrasion resistance and tintability were obtained and the results are also set forth in Table III.

EXAMPLES 4-7

To illustrate further the tintability of the coating compositions of the present invention, Example 4 was prepared in accordance with the present invention by mixing 75 parts by weight colloidal silica suspension (Nalco ® 84SS-258), 7.5 parts GPTMS and 5 parts by weight water for 1½ hours. 5 parts triglycidyl ether (Epirez 5044) and 10 parts vinyl acetate were added and mixed until the solution was homogeneous. Next, 4 parts triphenyl sulfonium hexafluoroantimonate and a trace of FC430, a flow control agent, were added. Two additional compositions, Examples 5 and 6, were prepared in an identical manner using the ingredients identified in Table III. Examples 4, 5 and 6 were coated at a 7 microns thickness on a polyester sheet, which was then passed through a UV processor as in Example 1. Excellent adhesion, abrasion resistance and tintability were obtained and the results are set forth in Table III.

To compare the differences in tintability between the coating compositions of the present invention and the coating compositions described in U.S. Pat. No. 4,348,462, Example 2 of U.S. Pat. No. 4,348,462 was duplicated using Nalco ® 1034A colloidal silica suspension in water to form the coating composition having the formula described under Example 7 in Table III, and was flow-coated on a polyester sheet and cured under UV-light in air for 3 seconds.

After curing, the light transmission was measured for each coating prior to immersing the coated substrate in a colored dye bath containing BPI Sun Brown (1:10 dilution), which was heated to a temperature of 90° C. Light transmittance through each coating was measured again after immersion in the dye bath for 5 minutes, again after a total immersion time of 15 minutes and then again after a total immersion time of 30 minutes. As the results in Table III show, the amount of light transmitted by Example 7, the composition described in Example 2 of U.S. Pat. No. 4,348,462, was reduced by only 7.5% after 5 minutes (from 91.3% to 83.8%) and by only 13.7% after 15 minutes. In contrast, the coating compositions of the present invention were reduced in light transmission by an amount ranging from 22.7 to 62.2% after 5 minutes, and were further reduced after 15 minutes until only from about 16.5 to about 43.4% of the light was being transmitted. Note that even after 30 minutes, Example 7 still had 73.5% light transmittance.

TABLE III

| EXAMPLES | 2 | 3 | 4 | 5 | 6 | 7 |
|---|---|---|---|---|---|---|
| Colloidal silica | 100 | 52 | 75 | 75 | 100 | 75 |
| MPTMS | 7.5 | — | — | 7.5 | 7.5 | 11.8 |
| GPTMS | — | 8 | 7.5 | — | — | 24.0 |
| WATER | 5 | 5 | 5 | 5 | 5 | — |
| Epirez 5044 | 5 | 5 | 5 | — | 5 | — |
| Rapi-Cure DVE | — | — | — | 2.5 | — | — |
| Araldite CY179 | — | — | — | 5 | — | — |
| tetraally-oxyethane | — | — | — | — | 2.5 | — |
| TMPTA | — | 10 | — | — | 2.5 | — |
| vinyl acetate | 10 | 10 | 10 | 10 | — | — |
| 2-hydroxy-ethylacrylate | — | — | — | — | — | 30 |
| diethylene-glycol-diacrylate | — | — | — | — | — | 8.8 |
| tetrahydro-furfuryl-acrylate | — | — | — | — | — | 8.8 |
| free radical initiator | 1.5 | 1.5 | — | 1.5 | 1.5 | 1.5 |
| cationic initiator | 1.5 | 1.5 | 4 | 1.5 | 1.5 | .44 |
| FC430 | trace | trace | trace | trace | trace | trace |

TABLE III-continued

| EXAMPLES | 2 | 3 | 4 | 5 | 6 | 7 |
|---|---|---|---|---|---|---|
| Adhesion (%) | 100 | 100 | 100 | 100 | 100 | 100 |
| Taber Abrasion | | | | | | |
| % ΔH$_{100}$ | 4.5 | 1.9 | 1.9 | 7.8 | — | 1.5 |
| % ΔH$_{500}$ | 5.9 | 9.5 | 6.4 | 9.1 | 7.6 | 7.0 |
| Tinted LT | | | | | | |
| 0 minutes | 90.2 | 90.1 | 89.4 | 90.1 | 91.8 | 91.3 |
| 5 minutes | 57.3 | 67.4 | — | 27.9 | 40.9 | 83.8 |
| 15 minutes | 43.4 | 40.0 | 38.2 | 16.5 | 31.8 | 77.6 |
| 30 minutes | 39.7 | 25.1 | — | 13.3 | 28.7 | 73.5 |

Other modifications and variations of the present invention are possible in light of the above teachings. For example, additives and other modifying agents may be added to the compositions of this invention. It is to be understood, however, that changes may be made in the particular embodiments described above which are within the full intended scope of the invention as defined in the appended claims.

What is claimed is:

1. A tinted article made by applying to at least one surface of a substrate a tintable, radiation-curable coating composition which forms a transparent, abrasion-resistant coating upon curing, said coating composition comprising:
   a. an effective abrasion-resistant amount of colloidal silica;
   b. about 0.05 to about 5 parts by weight per each part colloidal silica of a hydrolysis product of a silane compound having a polymerizable functional group;
   c. an effective tintable amount of a polyfunctional, polymerizable non-acrylate-functional ether; and
   d. a catalytic amount of a radiation sensitive initiator; curing said coating composition on the surface of said substrate by exposing said composition to high intensity irradiation for a period of time sufficient to form a transparent, tintable, abrasion-resistant coating; and immersing the coated surface of the substrate in a dye bath for a period of time sufficient for the coating to absorb or transmit to the substrate a desired amount of dye.

2. An article as in claim 1 wherein said silane is selected from (i) acryloxy-functional silanes having a general formula:

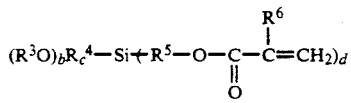

wherein $R^3$ and $R^4$ are the same or different monovalent hydrocarbon radicals, $R^5$ is a divalent hydrocarbon radical having from 2 to 3 carbon atoms, $R^6$ is hydrogen or a monovalent hydrocarbon radical, b is an integer from 1 to 3, c is an integer from 0 to 2, and d is an integer equaling 4-b-c; or (ii) glycidoxy-functional silanes having a general formula:

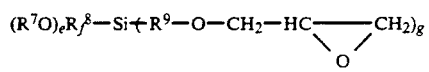

wherein $R^7$ and $R^8$ are the same or different monovalent hydrocarbon radicals, $R^9$ is a divalent hydrocarbon radical having from 2 to 8 carbon atoms, e is an integer from 1 to 3, f is an integer from 0 to 2, and g is an integer equaling 4-e-f; or (iii) mixtures of (i) and (ii).

3. An article as in claim 2 wherein said coating composition additionally comprises a monofunctional monomer.

4. An article as set forth in claim 3 wherein said monofunctional monomer comprises vinyl acetate.

5. An article as set forth in claim 3 wherein said monofunctional monomer comprises phenyl allyl ether.

6. An article as set forth in claim 3 wherein said monofunctional monomer is selected from the group consisting of 2-hydroxyl ethyl acrylate, tetrahydrofurfuryl acrylate, tetrahydrofurfuryl methacrylate; methyl acrylate, methyl methacrylate, ethyl acrylate, ethyl methacrylate, propyl acrylate, propyl methacrylate.

7. An article as set forth in claim 2 wherein said acryloxy-functional silane is selected from the group consisting of
   3-methacryloxypropyltrimethoxysilane;
   3-acryloxypropyltrimethoxysilane;
   2-methacryloxyethyltrimethoxysilane;
   2-acryloxyethyltrimethoxysilane;
   3-methacryloxypropyltriethoxysilane;
   3-acryloxypropyltriethoxysilane;
   2-methacryloxyethyltriethoxysilane; and
   2-acryloxyethyltriethoxysilane.

8. An article as set forth in claim 2 wherein said glycidoxy-functional silane is selected from the group consisting of
   3-glycidoxypropyltrimethoxysilane;
   2-glycidoxyethyltrimethoxysilane;
   3-glycidoxypropyltriethoxysilane; and
   2-glycidoxyethyltriethoxysilane.

9. An article as set forth in claim 2 wherein said polyfunctional, non-acrylate-functional ether is selected from the group consisting of compounds having at least one of the following moieties:
   glycidyl ether;
   allyl ether;
   vinyl ether; and
   cycloaliphatic epoxide.

10. An article as set forth in claim 9 wherein said polyfunctional non-acrylate functional ether comprises a mixture of at least two compounds, each of which has at least one of the identified moieties.

11. An article as set forth in claim 2 wherein said polyfunctional, non-acrylate-functional ether comprises a mixture of a triglycidyl ether and a polyethylene glycol divinyl ether.

12. An article as set forth in claim 2 wherein said polyfunctional, non-acrylate-functional ether comprises a mixture of a triglycidyl ether and a polyallyl-functional ether.

13. An article as set forth in claim 12 wherein said polyfunctional, non-acrylate-functional ether comprises a mixture of a triglycidyl ether and tetraallyloxyethane.

14. An article as set forth in claim 2 wherein said polyfunctional, non-acrylate-functional ether comprises a mixture of a triglycidyl ether and a cycloaliphatic diepoxide.

15. An article as set forth in claim 2 wherein said polyfunctional, non-acrylate-functional ether comprises a mixture of a polyethylene glycol divinyl ether and a cycloaliphatic diepoxide.

16. An article as set forth in claim 2 wherein said coating composition additionally comprises a multifunctional acrylate monomer.

17. An article as set forth in claim 16 wherein said multifunctional acrylate monomer does not contain a silyl moiety.

18. An article as set forth in claim 2 wherein said radiation sensitive initiator is an aromatic onium salt having a formula:

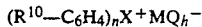

$$(R^{10}-C_6H_4)_n X^+ MQ_h^-$$

wherein X is a radical selected from I, P or S; and M is a metal or metalloid and Q is a halogen radical selected from Cl, F, Br, or I; $R^{10}$ is hydrogen or a monovalent hydrocarbon radical having 1 to 12 carbon atoms, h is an integer having a value of 4 to 6 inclusive, and n is an integer having a value of 2 or 3.

19. An article as set forth in claim 18 wherein said initiator is present in an amount from about 0.05 to 10.0 percent of the total mixture.

20. An article as set forth in claim 18 wherein said initiator is further combined with a free radical photoinitiator in an amount from about 0.5 to about 10.0 percent of the total mixture.

21. An article as set forth in claim 20 wherein said free radical photoinitiator is selected from the group consisting of benzophenone, ethyl benzoin ether, isopropyl benzoin ether, dimethoxyphenylacetophenone, and diethoxyacetophenone.

22. An article as set forth in claim 2 wherein the substrate is a polycarbonate lens.

23. An article as set forth in claim 2 wherein the substrate is selected from the group consisting of a glass lens, an acrylic plastic, a polyethylene terphthalate film, and a polyester film.

24. A tinted article made by applying to at least one surface of a substrate a tintable, photocurable coating composition which forms a transparent, abrasion-resistant coating upon curing, said coating composition comprising (a) an effective abrasion resistant amount of colloidal silica; (b) from about 0.05 to about 5 parts per each part colloidal silica of a hydrolysis product of glycidoxypropyltrimethoxysilane; (c) from about 0.1 to about 1.0 parts per each part colloidal silica of a triglycidyl ether; and (d) a catalytic amount of triphenylsulfonium hexafluoroantimonate; curing said coating composition on the surface of said substrate by exposing said composition to high intensity irradiation for a period of time sufficient to form a transparent, tintable, abrasion-resistant coating; and immersing the coated surface of the substrate in a dye bath for a period of time sufficient for the coating to absorb or transmit to the substrate a desired amount of dye.

25. An article as set forth in claim 24 wherein said coating composition additionally comprises from about 0.1 to about 1.5 parts per each part colloidal silica of vinyl acetate.

26. An article as set forth in claim 24 wherein the substrate is a polycarbonate lens.

27. An article as set forth in claim 24 wherein the substrate is selected from the group consisting of a glass lens, an acrylic plastic, a polyethylene terphthalate film, and a polyester film.

28. A tinted article made by applying to at least one surface of a substrate a tintable, photocurable coating composition which forms a transparent, abrasion-resistant coating upon curing, said coating composition comprising: (a) an effective abrasion-resistant amount of colloidal silica; (b) from about 0.05 to about 5 parts per each part colloidal silica of 3-glycidoxypropyltrimethoxysilane; (c) from about 0.1 to about 1.0 parts per each part colloidal silica of a triglycidyl ether; (d) from about 0.05 to about 1.5 parts per each part colloidal silica of trimethylolpropane triacrylate; and (e) a catalytic amount of benzophenone and triphenylsulfonium hexafluoroantimonate; curing said coating composition on the surface of said substrate by exposing said composition to high intensity irradiation for a period of time sufficient to form a transparent, tintable, abrasion-resistant coating; and immersing the coated surface of the substrate in a dye bath for a period of time sufficient for the coating to absorb or transmit to the substrate a desired amount of dye.

29. An article as set forth in claim 28 wherein such coating composition additionally comprises from about 0.1 to about 1.5 parts per each part colloidal silica of vinyl acetate.

30. An article as set forth in claim 28 wherein the substrate is a polycarbonate lens.

31. An article as set forth in claim 28 wherein the substrate is selected from the group consisting of a glass lens, an acrylic plastic, a polyethylene terphthalate film, and a polyester film.

32. A tinted article made by applying to at least one surface of a substrate a tintable, photocurable coating composition which forms a transparent, abrasion-resistant coating upon curing, said coating composition comprising: (a) an effective abrasion-resistant amount of colloidal silica; (b) from about 0.05 to about 5 parts per each part colloidal silica of gramma-methacryloxypropyltrimethoxysilane; (c) from about 0.1 to about 1.0 parts per each part colloidal silica of a mixture of a triglycidyl ether and 1,1,2,2-tetraallyloxyethane; and (d) a catalytic amount of triphenylsulfonium hexafluoroantimonate and benzophenone; curing said coating composition on the surface of said substrate by exposing said composition to high intensity irradiation for a period of time sufficient to form a transparent, tintable, abrasion-resistant coating; and immersing the coated surface of the substrate in a dye bath for a period of time sufficient for the coating to absorb or transmit to the substrate a desired amount of dye.

33. An article as set forth in claim 32 wherein said coating composition additionally comprises from about 0.1 to about 1.5 parts per each part colloidal silica of vinyl acetate.

34. An article as set forth in claim 32 wherein the substrate is a polycarbonate lens.

35. An article as set forth in claim 32 wherein the substrate is selected from the group consisting of a glass lens, an acrylic plastic, a polyethylene terphthalate film, and a polyester film.

* * * * *